(12) United States Patent
Feltham et al.

(10) Patent No.: US 12,391,318 B2
(45) Date of Patent: Aug. 19, 2025

(54) ADAPTER ARRANGEMENT FOR A SEMITRAILER TRAIN ARRANGEMENT

(71) Applicant: SAF-HOLLAND GmbH, Bessenbach (DE)

(72) Inventors: Alan Feltham, Schweiz (CH); Randy Kübler, Gottmadingen (DE); Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 748 days.

(21) Appl. No.: 17/597,431

(22) PCT Filed: Jul. 6, 2020

(86) PCT No.: PCT/EP2020/069019
§ 371 (c)(1),
(2) Date: Jan. 5, 2022

(87) PCT Pub. No.: WO2021/005012
PCT Pub. Date: Jan. 14, 2021

(65) Prior Publication Data
US 2022/0281539 A1 Sep. 8, 2022

(30) Foreign Application Priority Data
Jul. 11, 2019 (DE) .................... 10 2019 118 836.9

(51) Int. Cl.
*B62D 53/12* (2006.01)
*B62D 53/08* (2006.01)

(52) U.S. Cl.
CPC ....... *B62D 53/125* (2013.01); *B62D 53/0842* (2013.01)

(58) Field of Classification Search
CPC ................... B62D 53/125; B62D 53/0842
See application file for complete search history.

(56) References Cited

U.S. PATENT DOCUMENTS 3,000,654 A 9/1961 Keener
6,474,673 B1 11/2002 Biggins

FOREIGN PATENT DOCUMENTS

| BR | 8902823 U2 * | 8/2011 | |
| CA | 2663459 A1 * | 10/2009 | ............... B60D 1/64 |
| EP | 2112008 | 10/2009 | |
| EP | 2357122 | 8/2011 | |
| EP | 3000696 | 4/2018 | |
| GB | 1249134 | 10/1971 | |
| GB | 2441752 A * | 3/2008 | ........... B62D 53/125 |
| WO | 9730890 | 8/1997 | |
| WO | WO-9730890 A1 * | 8/1997 | ............... B60P 3/073 |
| WO | WO-2008009660 A1 * | 1/2008 | ............... B60D 1/363 |

OTHER PUBLICATIONS

European Patent Office; International Search Report; Sep. 29, 2020; entire document.

* cited by examiner

*Primary Examiner* — Jacob D Knutson
(74) *Attorney, Agent, or Firm* — Price Heneveld LLP

(57) ABSTRACT

An adapter arrangement, in particular fifth wheel adapter arrangement, for a semitrailer train, comprising a base body, a coupling arrangement, in particular a fifth wheel coupling plate, and a king pin, wherein the king pin is fixed indirectly and/or directly to the base body, wherein in particular the coupling arrangement is stationary relative to the king pin.

15 Claims, 3 Drawing Sheets

ADAPTER ARRANGEMENT FOR A SEMITRAILER TRAIN ARRANGEMENT

BACKGROUND OF THE INVENTION

The invention relates to an adapter arrangement for a semitrailer train arrangement.

Semitrailer train arrangements are already known from the prior art, comprising at least a towing vehicle and a trailer. The towing vehicle has a fifth wheel arrangement and the trailer has a king pin, wherein the fifth wheel arrangement and the king pin can be coupled to each other in such a way that a tractive force can be transmitted from the towing vehicle to the trailer via these elements. However, a problem with these known coupling arrangements is that the king pins of the trailers sometimes do not match the fifth wheel arrangements of the towing vehicles. Therefore, either the fifth wheel coupling arrangement or the king pin must be changed in order to achieve a safe coupling of the trailer to the towing vehicle.

It is therefore an object of the invention to provide a system which enables a safe coupling between a trailer and a towing vehicle without causing a high amount of work.

Further advantages and features result from the subclaims, the description and the figures.

SUMMARY OF THE INVENTION

The invention relates to an adapter arrangement, in particular a fifth wheel adapter arrangement, for a semitrailer train comprising a base body, a coupling arrangement, in particular a fifth wheel coupling plate, and a king pin, wherein the king pin is fixed indirectly and/or directly to the base body, wherein in particular the coupling arrangement is stationary relative to the king pin. The adapter arrangement according to the invention serves to be arranged in a semitrailer train. The adapter arrangement thereby fulfils the function of an intermediate piece or intermediate arrangement between a towing vehicle and a trailer. In other words, this may mean that the adapter arrangement in particular does not itself form part of the towing vehicle or the trailer. Advantageously, the adapter arrangement is designed without supporting wheels for this purpose. By designed without supporting wheels it is to be understood that the adapter arrangement does not comprise a supporting wheel which is intended to contact the ground during the travel of the semitrailer train. In particular, the adapter arrangement is configured as a fifth wheel coupling adapter arrangement. In other words, this may mean that the adapter arrangement is intended to be arranged in a semitrailer train, wherein a semitrailer train is in particular characterized in that the trailer is designed as a semitrailer, in particular with a king pin, and the towing vehicle is designed as a towing vehicle with a fifth wheel plate. The adapter arrangement according to the invention serves to be arranged between the towing vehicle and the trailer, and to transmit the tractive forces during travel between these vehicle parts of the semitrailer train. For this purpose, the adapter arrangement according to the invention comprises a coupling arrangement and a king pin, wherein in a coupled state in which the adapter arrangement transmits forces to both the towing vehicle and the trailer, the king pin of the adapter arrangement is arranged in a fifth wheel coupling adapter arrangement of the towing vehicle and a king pin of the trailer of the semitrailer train arrangement is arranged in the coupling arrangement of the adapter arrangement. In particular, the king pin of the adapter arrangement is indirectly and/or directly fixed to the base body of the adapter arrangement. This base body therefore serves to act as a secure support for the king pin. The coupling arrangement of the adapter arrangement according to the invention serves to be able to couple with a king pin of a trailer, as already described. For this purpose, the coupling arrangement in particular has an entry opening for inserting the king pin of the trailer and a locking mechanism. The locking mechanism serves to prevent, in a coupled state of the king pin of the trailer, the exit of this king pin, in particular in a form-fitting manner. The locking mechanism of the coupling arrangement may in particular comprise a latch mechanism and/or a lock claw. The coupling arrangement itself may, for example, be formed at least partially by the base body. In particular, this may be done by the base body itself having the retraction opening and that the locking mechanism is mounted on the base body and/or is at least partially formed by the base body itself. Preferably, the base body itself also additionally forms a bearing surface of the coupling arrangement. Therein, the bearing surface of the coupling arrangement is that surface or is formed by those surfaces on which the trailer rests in the coupled state. In other words, this may mean that at least some parts of the coupling arrangement may be formed integrally with the base body. In addition to at least some parts of the coupling arrangement being formed integrally with the base body, the coupling arrangement may alternatively or additionally preferably be designed as a separate coupling plate which is in particular fixed to the base body. Preferably, the coupling arrangement is designed such that it is stationary relative to the king pin. In this context, stationary means that the position of the coupling arrangement relative to the king pin is the same both in the coupled and in the uncoupled state. In this respect, however, it should be noted that should, for example, certain parts of the coupling arrangement be able to perform a certain amount of clearance and/or rotational compensation movement, in particular about a horizontal axis, there will nevertheless be a stationary stability of the coupling arrangement relative to the king pin within the meaning of the invention. In particular or alternatively, it is preferred that the coupling arrangement is rotationally rigid relative to the king pin about the extension direction of the king pin. In this way, a particularly mechanically loadable adapter arrangement can be achieved. By means of the adapter arrangement according to the invention, it is possible to achieve a safe coupling between a trailer and a towing vehicle without dismantling the king pin of the trailer and/or the fifth wheel plate of the towing vehicle, because the adapter arrangement represents a type of coupling adapter which makes it possible to couple together even king pin-fifth wheel constellations of a semitrailer train which do not match in principle. Therefore, the adapter arrangement according to the invention is able to enable a safe coupling between a trailer and a towing vehicle without causing a high amount of work.

Preferably, the king pin is arranged on a king pin surface of the base body, in particular rigidly, indirectly and/or directly, and/or preferably, the coupling arrangement is arranged on a fifth wheel coupling surface of the base body, in particular rigidly, indirectly and/or directly. By rigidly arranged in this context, it is to be understood that the arrangement eliminates any translational and/or rotational degrees of freedom in relation to the base body. In other words, this may mean that rigidly arranged is understood to mean that all degrees of freedom of the body (king pin or coupling arrangement) is eliminated or prevented by the arrangement. This can be done, for example, by arranging by means of screws, bolts or by means of welding in relation to the base plate. This rigid arrangement of the king pin and/or the coupling arrangement, in particular the fifth wheel plate, on the king pin surface or on the fifth wheel surface of the base body results in a particularly space-saving adapter arrangement.

It is particularly preferred, in order to achieve a particularly compact and easy-to-manufacture adapter arrangement, if the king pin surface is formed substantially parallel to the fifth wheel coupling surface. In particular, two surfaces are substantially parallel if the smallest possible angle of the normals of these surfaces (independent of direction) is at most 7°, preferably at most 5°, more preferably at most 2° and even more strongly preferably at most 1°.

Advantageously, the king pin is arranged on the base body opposite to the coupling arrangement in the direction of an extension direction of the king pin. The extension direction of the king pin is the direction in which the king pin extends. Advantageously, the king pin is formed substantially rotationally symmetrical with respect to this extension direction. A king pin is substantially rotationally symmetrical in particular if the surfaces which can contact a coupling arrangement in the engaged state are formed rotationally symmetrically with respect to the extension direction. By arranging the king pin in the direction of the extension direction of the king pin opposite to the coupling arrangement on the base body, a particularly space-saving and compact adapter arrangement results. The compactness of the adapter arrangement can in particular also save weight, so that the handling of the adapter arrangement can be greatly simplified by a space-saving and/or compact arrangement.

Preferably, the extension direction of the king pin is substantially parallel to a normal of a bearing surface of the coupling arrangement. By this alignment of the king pin in relation to the bearing surface of the coupling arrangement, the coupling process of the adapter arrangement to both the towing vehicle and the trailer can be facilitated. The bearing surface is formed by the surface or surfaces on which the trailer rests in a coupled state.

Advantageously, the projection of the king pin in the direction of the extension direction of the king pin is at least partially, in particular completely, covered by the projection of the coupling arrangement in the direction of the extension direction of the king pin. This arrangement of the king pin on the base body in relation to the coupling arrangement results in a particularly space-saving and compact adapter arrangement. Projections are in particular covering when the outer contour of one projection is completely enclosed by the other projection. In this respect, however, it should be noted that a possible entry opening of the coupling arrangement is not decisive for the projection. In other words, this may mean that the part of the contour of the projection of the coupling arrangement which is formed by the entry opening must be connected by a connecting line and that the projection of the king pin may be located within this new projection in order to be considered as covered by the projection of the coupling arrangement within the meaning of the invention.

Preferably, the adapter arrangement comprises an alignment arrangement, in particular a wedge and/or a wedge arrangement. In particular, the wedge and/or wedge arrangement is such that said wedge and/or wedge arrangement is substantially rigidly attached to the adapter arrangement and/or is non-rotatably attached around the kingpin. Therein, the wedge or wedge arrangement is in particular such that the wedge or wedge arrangement prevents rotation of the adapter arrangement relative to a towing vehicle, in particular a fifth wheel coupling arrangement on the towing vehicle.

Via the wedge or via the wedge arrangement, the adapter is aligned to the towing vehicle during coupling between the adapter arrangement and the towing vehicle. The alignment arrangement is designed to be positively engaged or engageable with parts of the towing vehicle in a coupled state, in particular with a fifth wheel coupling adapter arrangement of the towing vehicle, so that rotation of the adapter arrangement about the king pin is positively prevented by the alignment arrangement—in the coupled state. This can in particular achieve that the adapter arrangement is rotationally rigid with respect to the towing vehicle in the engaged state. This has in particular the advantage that laterally lying parts of the adapter arrangement cannot collide with the towing vehicle—due to the relative rotation of the adapter arrangement to the towing vehicle—during travel.

Preferably, the adapter arrangement comprises a plug connector, in particular for an automatic coupling system. The plug connector is used to connect the adapter arrangement to the towing vehicle and/or to the trailer in terms of energy. Therein, preferably, the connector is part of an automatic coupling system. This enables the adapter arrangement to be part of an automatic coupling system. Preferably, this automatic coupling system is designed in such a way that the plug connector can be automatically connected to a corresponding plug element, where automatically is to be understood in particular as meaning that no manual intervention has to be carried out on the plug connector and/or on the corresponding plug element in order to connect the plug connector to the plug element in an energy-conducting manner. For example, this can be done by connecting the plug connector in an energy-conducting manner to the plug element located on the towing vehicle and/or on the trailer by the relative movement of the adapter arrangement to the towing vehicle and/or to the trailer. Alternatively, preferably, the plug connector can also be automatically displaced by an active actuator only after the king pin of the adapter arrangement has been coupled to the fifth wheel coupling plate of the towing vehicle and/or after the king pin on the trailer side has been coupled to the coupling arrangement of the adapter arrangement.

Advantageously, the plug connector comprises a connecting plug. This connecting plug advantageously has energy contacts, in particular hydraulic, pneumatic and/or electrical contacts, which can be connected in an energy-conducting manner to corresponding contacts of a plug element of a towing vehicle or a trailer. Advantageously, the connecting plug has guide pins to assist the actual insertion. By providing a connecting plug on the plug connector, a part of an automatic coupling system can be provided on the adapter arrangement in a simple manner. This may allow, for example, that if only the trailer or the towing vehicle has an automatic coupling system and/or if the automatic coupling systems of the trailer and the towing vehicle are not compatible with each other, then the adapter arrangement may serve as a means of providing an energy-conducting connection between the trailer and the towing vehicle—despite these non-existent or non-compatible systems.

In an advantageous embodiment, the connecting plug is spaced from the king pin, in particular in the direction of the extension direction of the king pin. Particularly preferably, the distance of the connecting plug from the coupling arrangement is greater than the distance of the connecting plug from the king pin, in particular in the direction of the extension direction of the king pin. By spacing the connecting plug from the king pin, in particular in the direction of the extension direction of the king pin, it can be achieved that when the king pin is coupled into a fifth wheel coupling plate or arrangement on the towing vehicle side, the accessibility of the connecting plug is not hindered by the king pin of the adapter arrangement. It is particularly preferred, if the distance of the connecting plug from the coupling arrangement is greater than the distance of the connecting plug from the king pin. In other words, this may mean that the connecting plug is arranged below the king pin in the direction extension direction of the king pin, so that the accessibility of the connecting plug is further increased.

In an advantageous embodiment, the coupling arrangement has an entry opening which extends in an entry direction, wherein a trailer king pin is insertable along the entry direction into the entry opening of the fifth wheel coupling arrangement, wherein the connecting plug is spaced from the fifth wheel coupling plate and/or from the king pin and/or from the base body in the direction of the entry direction. This can in particular prevent a collision of the connecting plug. In addition, this spacing of the connecting plug can also facilitate the coupling of the connecting plug into a corresponding mating element of an automatic coupling system.

Preferably, the plug connector is rigidly fixed to the base body. By rigidly arranging the plug connector on the base body, it can be achieved that a particularly secure fixing of the plug connector can take place. Furthermore, the rigid arrangement of the plug connector on the base body may further be used to allow the plug connector to serve as an alignment device of the adapter arrangement. For example, the plug connector may be positively, non-positively and/or materially fixed to the base body by means of fastening means. Preferably, however, these fastening means are reversibly releasable. For example, the fastening means for this purpose may be a screw. The reversible releasability enables the plug connector to be easily replaced in the event of damage to the plug connector. Alternatively preferably, however, the connector may be rotatably mounted about the king pin of the adapter arrangement.

In an advantageous embodiment, the plug connector is fixed indirectly and/or directly to the base body, in particular reversibly. This allows a particularly secure fixing of the base body to the connector.

Preferably, the adapter arrangement comprises a connection console for connection to a cable assembly, in particular a spiral cable, and/or wherein the adapter arrangement comprises a cable assembly, in particular a spiral cable, wherein the cable assembly is adapted to be connected to a trailer in an energy-conducting manner. By means of the connection console and/or by means of the cable assembly, an energy-conducting connection to a trailer can be made in a simple manner. Alternatively preferably, the cable assembly may also be configured to be connected to a towing vehicle. In particular, this type of embodiment is advantageous if the adapter arrangement serves to connect a trailer or towing vehicle equipped with a part of an automatic coupling system to a towing vehicle or trailer not equipped with an automatic coupling system. In this exemplary situation, therefore, the adapter arrangement serves as a type of power coupling between the power lines of the towing vehicle or trailer with the power lines of the trailer or towing vehicle. For example, the adapter arrangement can therefore be used in particular in areas of ports where a plurality of different trailers which are partly equipped with an automatic coupling system or just not equipped with an automatic coupling system are to be connected to a smaller number of towing vehicles which are equipped with automatic coupling systems. In particular, the cable assembly may be designed as a spiral cable in order to be able to compensate for a relative translational or rotational change in position of the adapter arrangement relative to the towing vehicle and/or to the trailer. Therein, the cable assembly may serve to transmit electrical, pneumatic and/or hydraulic energy. The connection console can be designed as a type of plug, which can be connected to the cable assembly in an energy-conducting manner.

Advantageously, the adapter arrangement comprises a support device, wherein the support device is adapted to support or be capable of supporting the adapter arrangement relative to a floor. By providing a support device, in particular the manageability and/or the storability of the adapter arrangement can be increased. Particularly preferably, the support device is adjustable or variable in its height, in particular in the direction of the extension direction of the king pin. This can be done, for example, by the support device being formed by one or more support legs. Therein, advantageously, the support legs are arranged rigidly on the base body in a indirect or direct manner. It is particularly preferred if these support legs are automatically adjustable in height by means of an electric, pneumatic or hydraulic drive. This can in particular further simplify the handling of the adapter arrangement.

Particularly preferably, the support device is integrally formed with the base body and/or wherein the support device is a part of the base body. In this way, a particularly mechanically loadable support of the adapter arrangement can be achieved.

In a preferred embodiment, the support device comprises at least one support surface and wherein the support surface is substantially perpendicular to the extension direction of the kingpin. Through this, a particularly low-tilt support device can be achieved, so that a particularly secure stand of the adapter arrangement can be achieved.

Another aspect of the invention may relate to a semitrailer train, the semitrailer train comprising an adapter arrangement as described above, a towing vehicle and a trailer. By using an adapter arrangement according to the invention in a semitrailer train, a particularly high degree of variability of the coupling members (king pin and fifth wheel coupling plate) of the semitrailer train can be achieved. In this respect, it is particularly preferred if the towing vehicle of the semitrailer train is an autonomous towing vehicle. Alternatively or additionally preferably, the towing vehicle has an automatic coupling system which comprises a connector element which is connected and/or connectable in an energy-conducting manner to the connector plug of the adapter arrangement according to the invention.

BRIEF DESCRIPTION OF THE DRAWINGS

Further advantages and features of the present invention will be apparent from the following description with reference to the figures. Therein, individual features of the embodiments shown may also be used in other embodiments, unless this has been expressly excluded. It is show in.

DETAILED DESCRIPTION OF THE PREFERRED EMBODIMENTS

Figure 1:
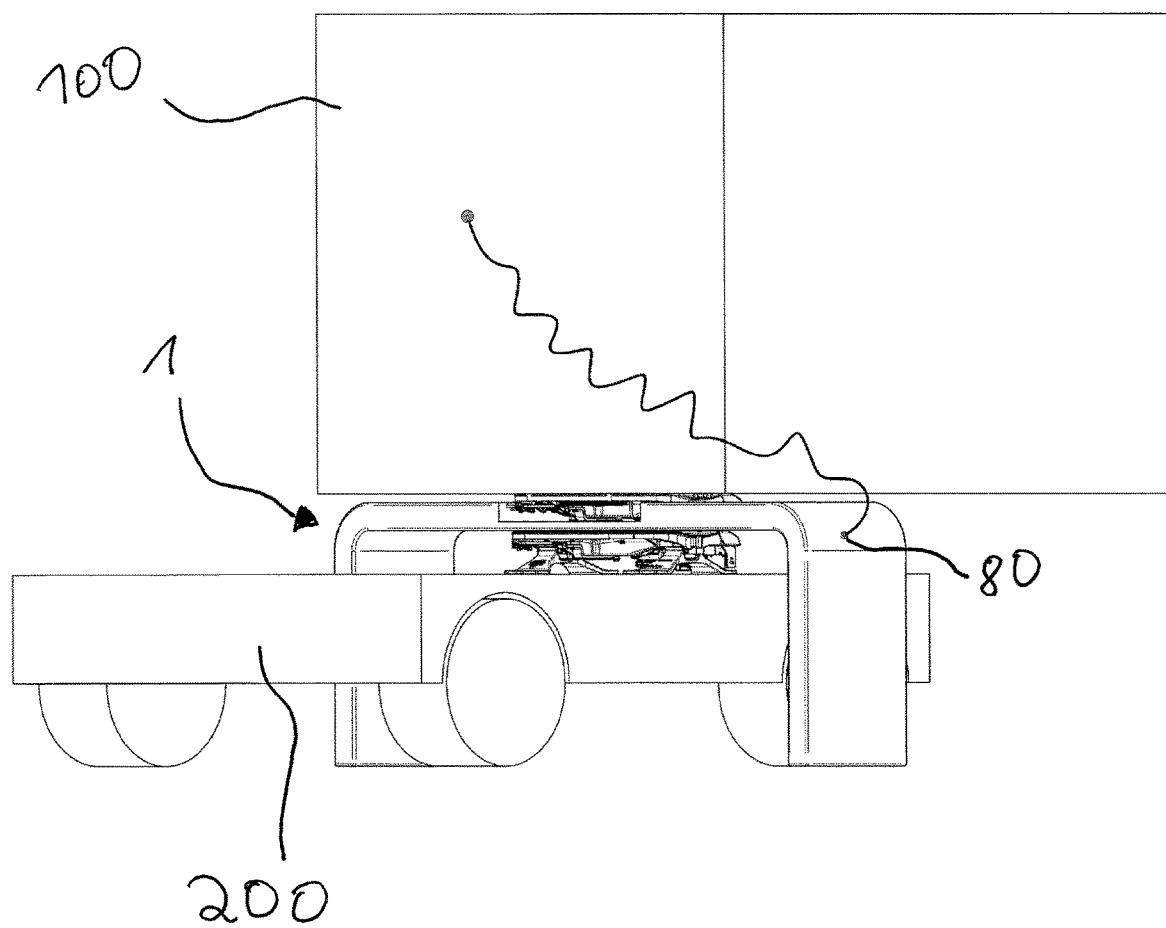
FIG. 1 is a perspective view of a semitrailer train comprising an adapter arrangement.

FIG. 1 shows a semitrailer train comprising a trailer 100, an adapter arrangement 1 and an autonomous towing vehicle

200. The trailer 100 is connected to the connection console 80 of the adapter arrangement 1 via a spiral cable.

Figure 2:
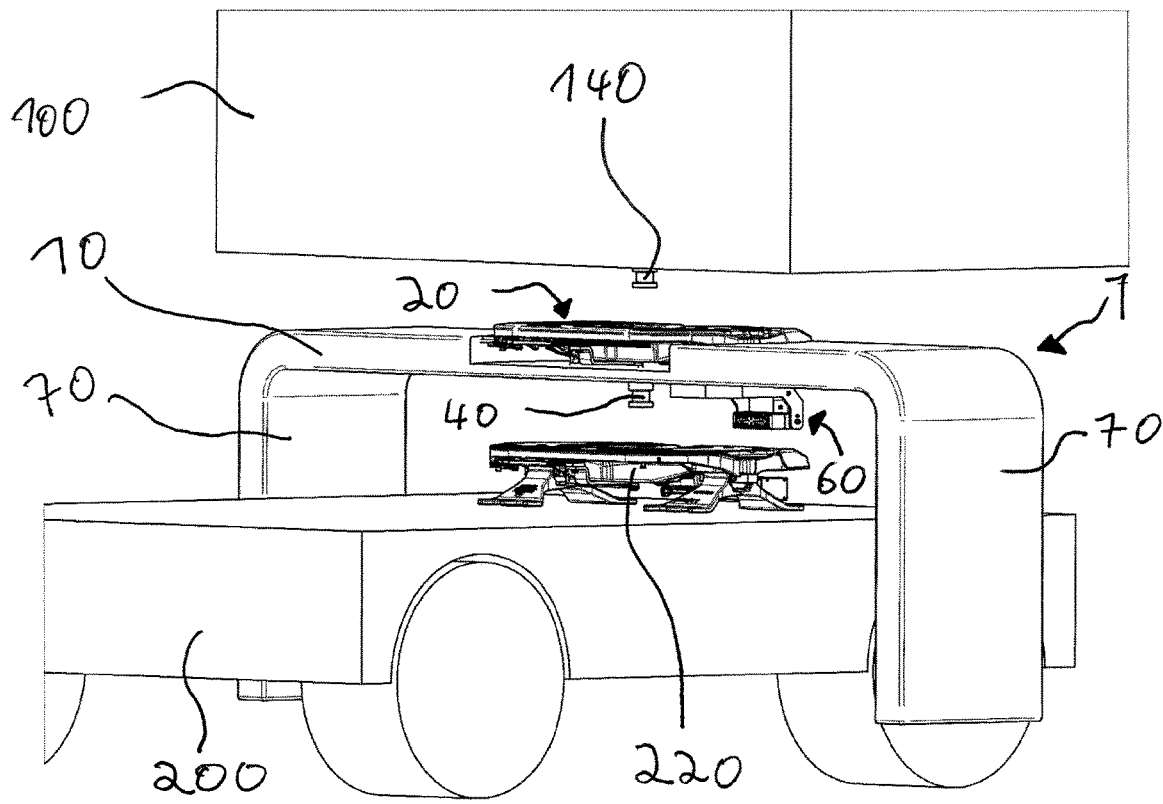
FIG. 2 is an exploded perspective view of a semitrailer train comprising an adapter arrangement.

FIG. 2 shows an exploded view of a semitrailer train comprising an adapter arrangement 1, a towing vehicle 200 and a trailer 100. The trailer 100 has a trailer king pin 140 which, in a coupled state, is connected to the coupling arrangement 20 by force, in particular by positive locking, so that tensile forces can be transmitted from the coupling arrangement 20 of the adapter arrangement 1 to the trailer king pin 140 of the trailer. Here, the coupling arrangement 20 of the adapter arrangement 1 is formed by a fifth wheel coupling plate in the illustrated embodiment. This fifth wheel coupling plate 20 is rigidly fixed to the base body 10 of the adapter arrangement 1. The base body 10 is integrally formed with the support devices 70, wherein these form the distally opposite ends of the base body 10. For transmitting forces to the towing vehicle 200, the adapter arrangement 1 according to the invention has a king pin 40 which is arranged in the towing vehicle fifth wheel coupling 220 in a coupled state and wherein forces can be transmitted between the king pin 40 and the towing vehicle fifth wheel 220 in a coupled state. The adapter arrangement 1 according to the invention also has a plug connector 60 for being connected or being connectable in an energy-conducting manner to a part of an automatic coupling system of the towing vehicle 200.

Figure 3:
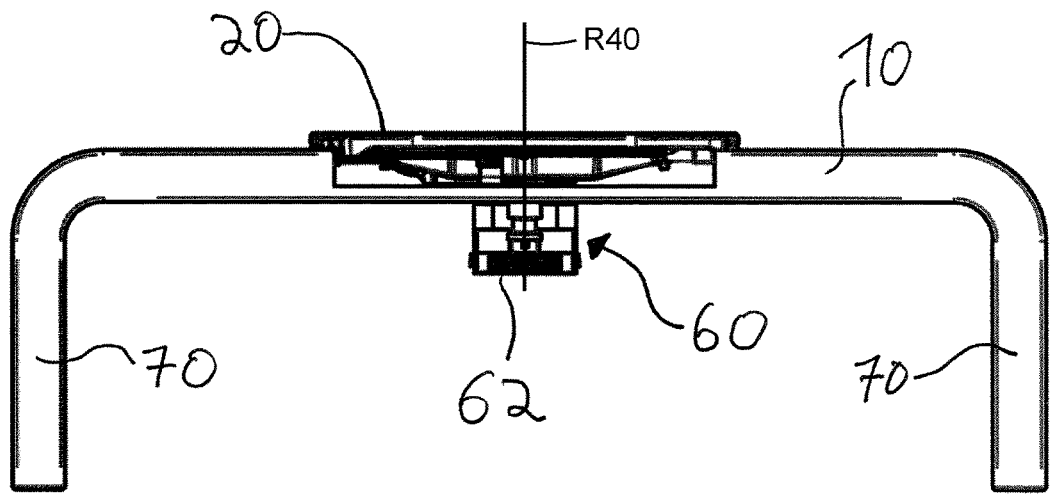
FIG. 3 is a front elevation view of an adapter arrangement.

FIG. 3 shows a front view of an adapter arrangement 1 according to the invention. The adapter arrangement 1 according to the invention has a base body 10 and a coupling arrangement 20 in the form of a fifth wheel coupling plate and a king pin 40, which extends in an extension direction of the king pin (R40). In the direction of this extension direction of the king pin below the coupling arrangement is the plug connector 60, which has a connecting plug 62. This connecting plug 62 is rotatably mounted in order to be able to perform a certain compensating movement.

Figure 4:
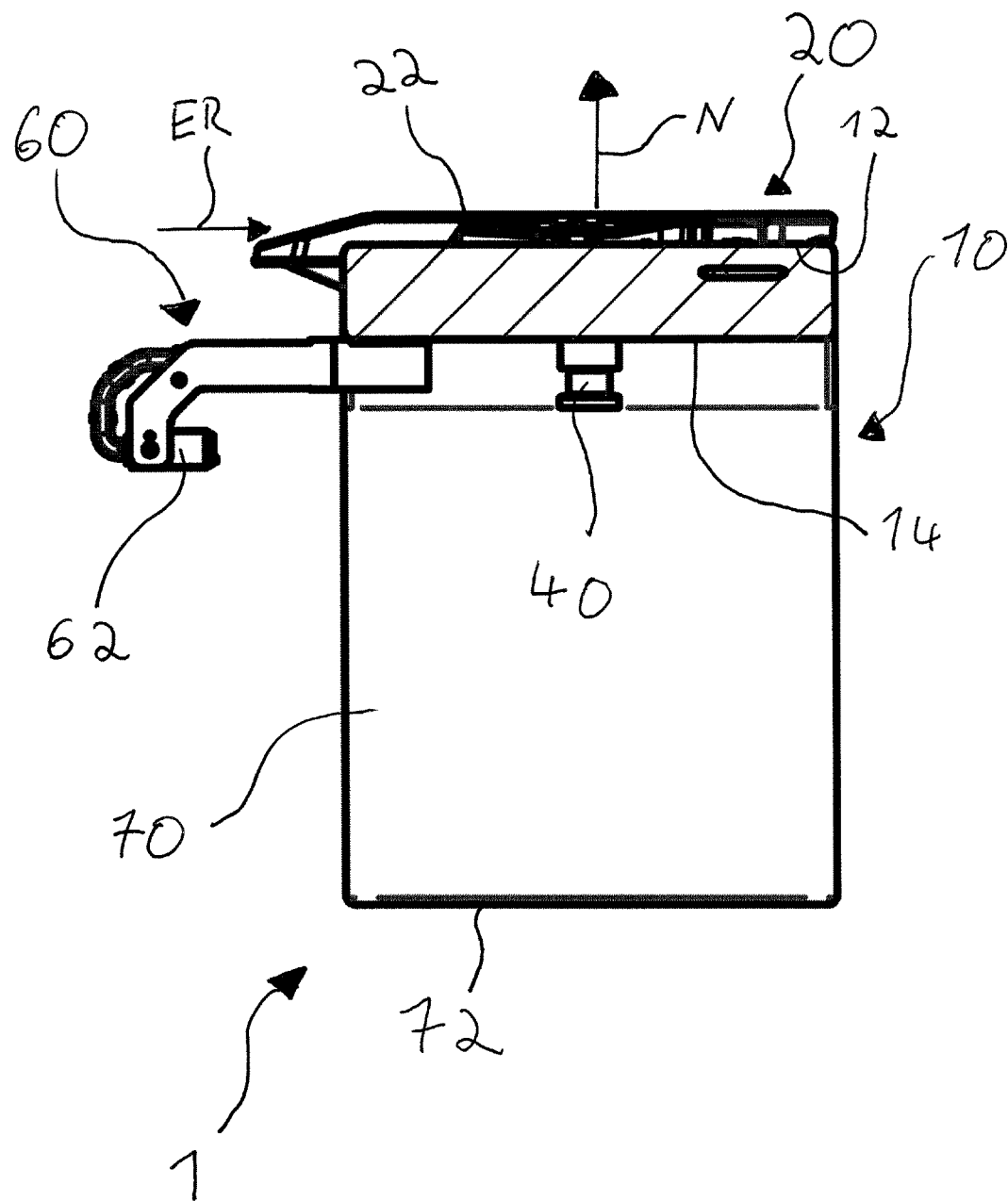
FIG. 4 is a cross-section elevation view through an adapter arrangement.

FIG. 4 shows a section through an adapter arrangement 1 according to the invention. The adapter arrangement 1 according to the invention has a coupling arrangement 20 in the form of a fifth wheel coupling plate. This fifth wheel coupling plate 20 is rigidly arranged on a fifth wheel coupling surface 12 of the base body. The coupling arrangement 20 has a bearing surface 22, which has an outwardly facing normal N. In addition, the coupling arrangement 20 also has an entry opening extending in an entry direction ER. Opposite the coupling arrangement 20, the king pin 40 of the adapter arrangement 1 is rigidly fixed to the king pin surface 14 on the base body 10. In the entry direction ER, the connecting plug 62 is spaced apart from both the coupling arrangement 20 as well as the king pin 40 and the base body 10. In the embodiment shown in FIG. 4, the adapter arrangement 1 has a support device 70 which is integrally formed with the base body 10. For support against a floor, the support device 70 has a support surface 72.

LIST OF REFERENCE SIGNS

1—adapter arrangement
10—base body
12—fifth wheel coupling surface
14—King pin surface
20—coupling arrangement
22—bearing surface
40—king pin
60—plug connector
62—connecting plug
70—support device
72—support surface
80—connection console
100—trailer
140—trailer king pin
200—towing vehicle
220—towing vehicle fifth wheel coupling
R40—Extension direction of the king pin
ER—entry direction
N—normal of the bearing surface

The invention claimed is:

1. A fifth wheel adapter arrangement for a semitrailer train, comprising
a base body;
a coupling arrangement for an automatic coupling system; and
a king pin of the adapter arrangement;
wherein the king pin of the adapter arrangement is fixed indirectly and/or directly to the base body;
wherein the coupling arrangement of the adapter arrangement includes a separate fifth wheel coupling plate of the adapter arrangement which is fixed to the base body, and wherein a trailer king pin and the fifth wheel coupling plate of the adapter arrangement are configured to automatically couple to one another;
wherein the coupling arrangement of the adapter arrangement is stationary relative to the king pin of the adapter arrangement;
wherein the adapter arrangement comprises a plug connector for the automatic coupling system;
wherein the plug connector of the adapter arrangement comprises a connecting plug for the automatic coupling system; and
wherein the connecting plug of the adapter arrangement is spaced from the king pin of the adapter arrangement in a direction of an extension direction of the king pin of the adapter arrangement.

2. The fifth wheel adapter arrangement according to claim 1, wherein the king pin of the adapter arrangement is arranged on a king pin surface of the base body rigidly and/or stationarily, indirectly and/or directly.

3. The fifth wheel adapter arrangement according to claim 1, wherein the coupling arrangement of the adapter arrangement is arranged on a fifth wheel coupling surface of the base body rigidly and/or stationarily, indirectly and/or directly.

4. The fifth wheel adapter arrangement according to claim 1, wherein the king pin of the adapter arrangement is arranged on the base body opposite to the coupling arrangement in the direction of the extension direction of the king pin of the adapter arrangement.

5. The fifth wheel adapter arrangement according to claim 1, wherein the extension direction of the king pin of the adapter arrangement is substantially parallel to a normal of a bearing surface of the coupling arrangement.

6. The fifth wheel adapter arrangement according to claim 1, wherein a projection of the king pin of the adapter arrangement in the direction of the extension direction of the king pin of the adapter arrangement is at least partially covered by a projection of the coupling arrangement in the direction of the extension direction of the king pin of the adapter arrangement.

7. The fifth wheel adapter arrangement of claim 6, wherein the projection of the king pin of the adapter arrangement of the extension direction of the king pin of the adapter arrangement is completely covered by the projection of the coupling arrangement in the direction of the extension direction of the king pin of the adapter arrangement.

8. The fifth wheel adapter arrangement according to claim 1, wherein the adapter arrangement comprises an alignment arrangement including a wedge and/or a wedge arrangement.

9. The fifth wheel adapter arrangement according to claim 1, wherein the connecting plug is spaced from the king pin of the adapter arrangement in the direction of the extension direction of the king pin of the adapter arrangement, and a distance of the connecting plug from the coupling arrangement is greater than a distance of the connecting plug from the king pin of the adapter arrangement in the direction of the extension direction of the king pin of the adapter arrangement.

10. The fifth wheel adapter arrangement according to claim 1, wherein the coupling arrangement has an entry opening which extends in an entry direction, wherein the trailer king pin is configured to be inserted along the entry direction into the entry opening of the coupling arrangement, and wherein the connecting plug is spaced from the coupling arrangement and/or from the king pin of the adapter arrangement and/or from the base body in the direction of the entry direction.

11. The fifth wheel adapter arrangement according to claim 1, wherein the plug connector is rigidly and/or stationarily fixed to and/or relative to the base body.

12. The fifth wheel adapter arrangement according to claim 1, wherein the adapter arrangement comprises a connection console for connecting to a cable assembly that includes a spiral cable, and/or wherein the adapter arrangement comprises a cable assembly that includes a spiral cable, wherein the cable assembly is adapted to be connected to a trailer in an energy-conducting manner.

13. The fifth wheel adapter arrangement according to claim 1, wherein the adapter arrangement comprises a support device, and wherein the support device is adapted to support or be capable of supporting the adapter arrangement relative to a floor.

14. The fifth wheel adapter arrangement according to claim 13, wherein the support device is integrally formed with the base body.

15. The fifth wheel adapter arrangement according to claim 13, wherein the support device comprises at least one support surface, and wherein the support surface is substantially perpendicular to the extension direction of the king pin of the adapter arrangement.

* * * * *